July 29, 1969    S. M. SHOBERT    3,457,962
GOLF CLUB SHAFT AND METHOD OF FORMING THE SAME
Filed Nov. 16, 1965    3 Sheets-Sheet 1

INVENTOR.
SAMUEL M. SHOBERT
BY Hood, Gust & Irish
ATTORNEYS

July 29, 1969  S. M. SHOBERT  3,457,962
GOLF CLUB SHAFT AND METHOD OF FORMING THE SAME
Filed Nov. 16, 1965  3 Sheets-Sheet 2
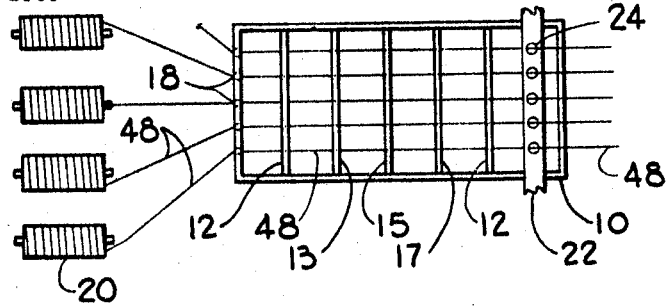
FIG.2
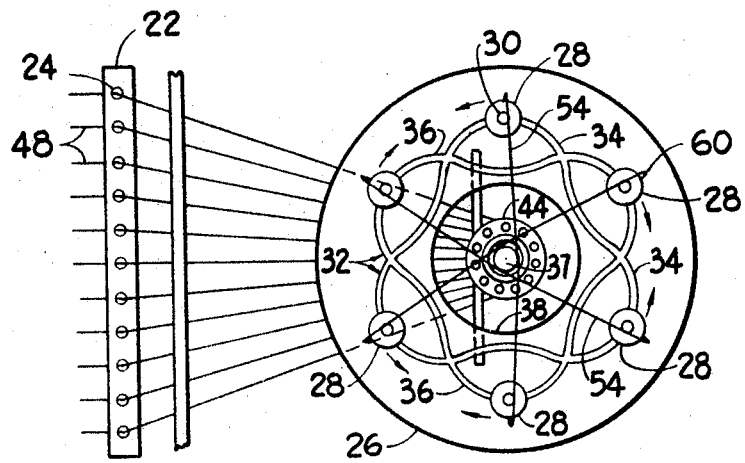
FIG.3
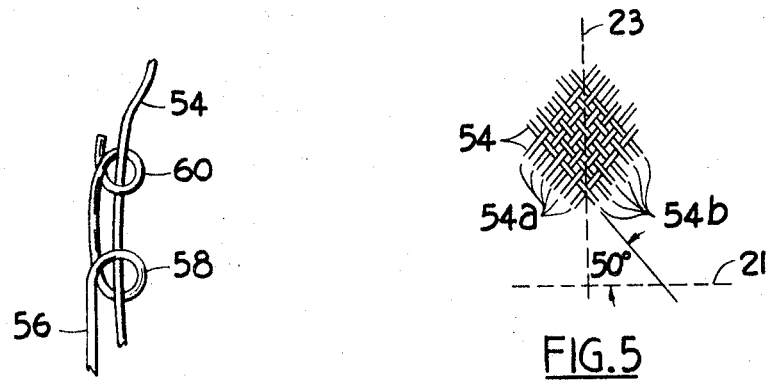
FIG.4
FIG.5
INVENTOR.
SAMUEL M. SHOBERT
BY Hood, Gust & Irish
ATTORNEYS July 29, 1969   S. M. SHOBERT   3,457,962
GOLF CLUB SHAFT AND METHOD OF FORMING THE SAME
Filed Nov. 16, 1965   3 Sheets-Sheet 3

INVENTOR.
SAMUEL M. SHOBERT
BY Hood, Gust & Irish
ATTORNEYS

United States Patent Office 3,457,962
Patented July 29, 1969

3,457,962
GOLF CLUB SHAFT AND METHOD OF FORMING THE SAME
Samuel M. Shobert, 17760 Dragoon Trail, Mishawaka, Ind. 46544
Filed Nov. 16, 1965, Ser. No. 508,067
Int. Cl. F16i 9/12
U.S. Cl. 138—144                                   16 Claims

ABSTRACT OF THE DISCLOSURE

This invention includes the product of a hollow reinforced plastic shaft which includes a plurality of contiguous layers of glass fiber reinforcement which surrounds a given imaginary axis. These layers are imbedded within and bonded to each other by a cured resinous material. Two of the layers each include strands of glass fibers extending in the form of a first helix in one circumferential direction and a second helix in the opposite circumferential direction. A third of the layers is clamped between these two layers and include a plurality of longitudinally extending substantially straight circumferentially adjacent strands of glass fiber. The two helical layers hold the strands of the third layer in position. The glass fibers of all of these layers extend in parallelism with the respective strand containing the same in substantially wrinkle-free condition.

The method of this invention includes the steps of braiding glass strands onto an elongated body for forming a first braided layer. The strands of these layers are applied under tension. A plurality of glass strands is drawn through a bath of liquid heat-hardenable resin and gathered in a second layer about the peripheral surface of the braided layer, these wetted strands being tensioned and arranged substantially parallel to the axis of the body. A third layer of tensioned glass strands is braided onto the second layer, this braiding operation being performed such as to frictionally exert a tension force on the strands of the second layer. The resin in the second layer is exuded into and impregnates the braided layers. The quantity of resin applied to the second layer strands is controlled so as to provide sufficient resin for impregnating and embedding the strands of all layers into a unified mass of resin. Finally, the resin is cured to bond all of the strands and layers together.

---

The present invention relates to a golf club shaft and the method of forming the same, and to a hollow rod or shaft composed of glass fiber and plastic, this product having an exceptionally high strength to weight ratio. Some attempts in the past have been made to fabricate golf club shafts from plastic reinforced with glass fiber. Such shafts mainly have been of solid cross-section, which has resulted in excessive weight. Efforts have been made to fabricate shafts in tubular form by wrapping sheets of glass cloth on mandrels, the resulting shaft thereby being laminated and tubular in shape. Such tabular shafts have proven to be unsatisfactory from the standpoints of non-uniformity in performance as well as torsional weakness. Also, such shafts after a period of usage have been found to delaminate.

Generally speaking, the performance of a golf club is dependent upon factors such as the weight and balance of the shaft, the flexibility of the shaft at positions along its length, the ability of the shaft to withstand shock and continued use, and the resistance of the shaft to moisture and weather. Also, a shaft must possess a required amount of stiffness and strength against twisting, without exceeding a desired weight to strength ratio.

While shafts of tempered tubular steel have come into prominence for the reason that such steel provides desired performance characteristics more readily than other material, nevertheless it has been found that such shafts possess performance limitations whereby the same golf ball stroked identically under precisely the same conditions a number of times will travel different distances. For example, tests conducted with a club having a steel shaft swung with a mechanism capable of swinging a club identically repeatedly has revealed that ten different strokings have resulted in balls settling within a thirty-five (35) to forty (40) yard diameter circle. In comparison, shafts made by the present invention and tested under identical conditions have resulted in balls terminating their travels within a circle of ten (10) yards in diameter.

Golf club shafts made according to the present invention have been found to have the required degree of strength and stiffness in a given weight of material, such material including plastic reinforced with glass fiber.

It is therefore an object of this invention to provide improvements in rods fabricated of plastic reinforced with glass fiber whereby such rods may be used reliably as shafts for golf clubs.

It is another object of this invention to provide a method for fabricating hollow rods formed of plastic reinforced with glass fiber, such rods possessing relatively great torsional and longitudinal strength and stiffness.

Further objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein:

FIG. 2 is a top plan view, in diagrammatic form, of a portion of the apparatus shown in FIG. 1;

FIG. 3 is a similar illustration of another portion of the apparatus of FIG. 1;

FIG. 4 is a fragmentary, enlarged view of a suitable eyelet configuration used in the apparatus as shown in FIGS. 1 and 3;

FIG. 5 is a diagrammatic illustration of the braid formed according to the methods of this invention by the apparatus of the preceding figures, this illustration being developed from a curved to a flat plane;

Figure 1:
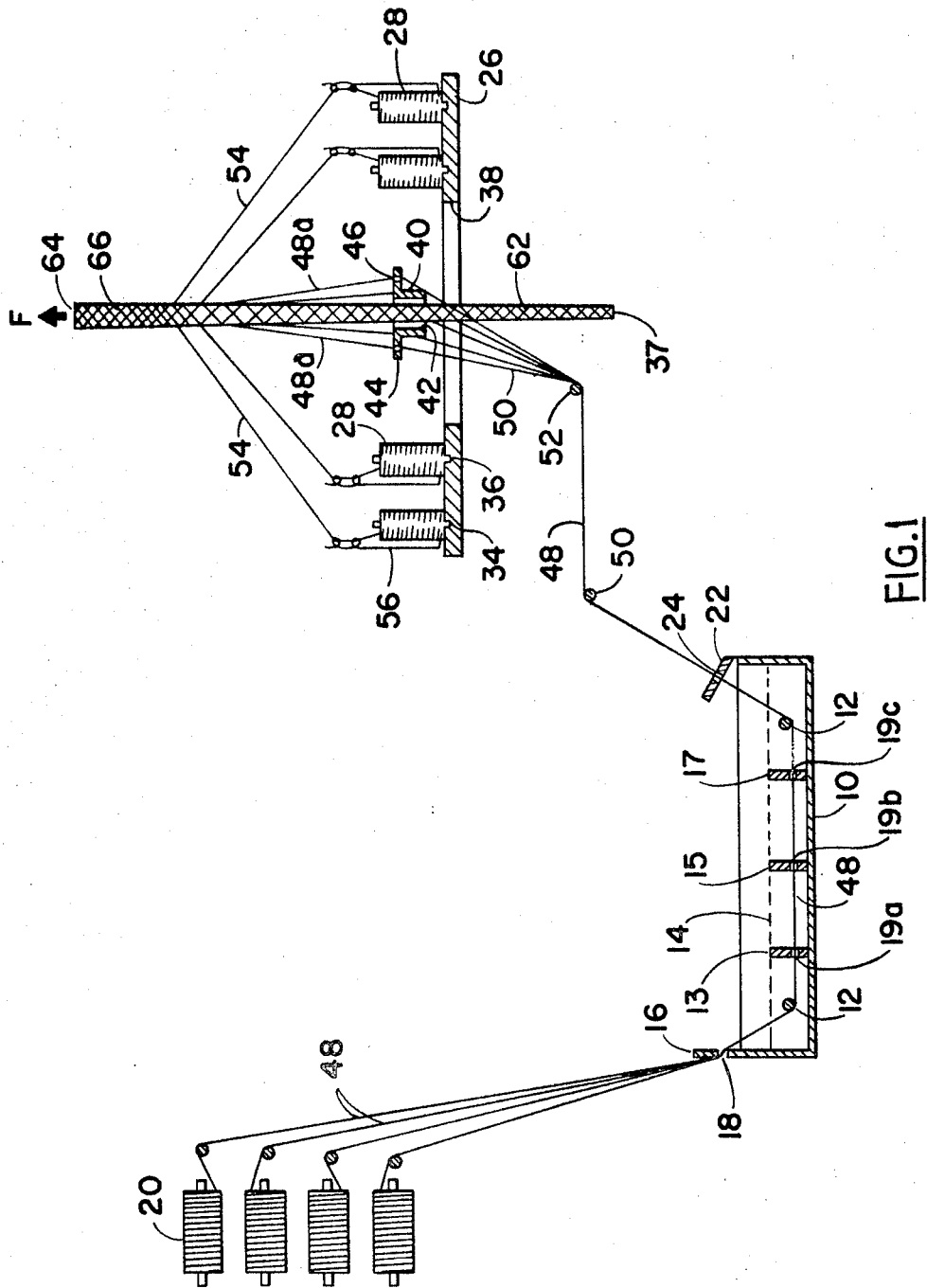
FIG. 1 is a side view in diagrammatic form of an apparatus used in the fabrication of a rod of this invention.

Referring to the drawings, and more particularly to FIGS. 1, 2 and 3, the apparatus comprises a tank or vessel 10 within which is mounted a plurality or horizontal bars of rollers 12 which are submerged in liquid heat-hardenable polyester or epoxy resin. For one embodiment of this invention, polyester is preferred. The level of such liquid material is indicated by the numeral 14. Situated toward the left of the rollers 12 is viewed in FIG. 1 is an upstanding extension 16 on the tank 10 having a plurality of horizontally spaced guiding apertures 18. These apertures preferably extend for the width of the tank 10.

Secured to the tank 10 and submerged in the liquid resin are at least three parallel, straight metal bars or strips 13, 15 and 17 spaced-apart substantially equally between the rollers 12. Each strip 13, 15, 17 contains a plurality of small openings 19a, 19b and 19c, respectively, arranged transversely of the tank 10 and submerged in resin. In one working embodiment of this invention, each strip 13, 15, 17 contains twenty-four such openings spaced equally apart.

Moving from left to right as viewed in FIG. 1, the openings 19a, 19b and 19c progressively decrease in size as explained more fully later on.

To the left of the tank 10 as viewed in FIGS. 1 and 2 is disposed a creel or frame (not shown) on which is mounted a plurality of spools 20 of glass thread or strand. This thread can be the same as that disclosed in Meek Patent No. 2,684,318 and Francis Patent No. 2,602,766 and the resin or plastic material used can also be the same as that disclosed in these two patents.

As used hereafter, the term "thread" or "strand" is intended to include, but not to be limited to a roving or yarn composed of a number of "ends," each "end" having two hundred and four (204) glass filaments or fibers. More or less filaments within reason may be used without departing from the scope or spirit of this invention. Desirably, these filaments are bundled together to form a continuous length of strand and are not twisted together except to the minimum extent required to maintain the continuity in the strand length. More detailed specifications for a particular embodiment of this invention are given hereinafter.

The term "glass fiber roving" as used in the appended claims defines a roving structured as above-described but having any number of "ends" and fibers as may be desired.

Fixedly secured with respect to the tank 10, adjacent to the right-hand end thereof as viewed in FIGS. 1 and 2, is a horizontal stripping bar 22 having a series of horizontally spaced apertures 24 therein. These apertures 24 are of critical size and determine the amount of resin retained by the strands which pass therethrough. This will be explained in more detail later on.

Again viewing FIG. 1, the openings 19a, 19b, 19c and 24 in a direction from left to right progressively decrease in size, the openings 24 benig the smallest. In one operating embodiment of this invention these openings 24 are circular and .055 inch in diameter. All of these openings 19a, 19b, 19c and 24 are in straight alignment longitudinally of the tank 10.

A conventional braiding machine carries on its supporting table 26 a suitable number (6, 12 or more) of spools 28 of glass strand. The spools 28 are supported on suitable spindles 30 which fit into guide grooves 32, these grooves following a circumferential undulating pattern as illustrated in FIG. 3. There are illustrated two series of spools on the table 26, three of them riding in the guide groove 34 and the other three in the groove 36. An elongated, cylindrical mandrel 37 coaxially passes through a clearance opening 38 in the center of the supporting table 26. An operator can hold the mandrel 37 in position and operate it in the manner as will be explained later. The table 26 is disposed horizontally and the mandrel 37 vertically coaxially thereof.

Fixedly mounted against movement on suitable supporting structure not shown is a strand-distributing or grouping ring 40 having a central opening 42 through which the mandrel 37 may coaxially pass freely. A right angle annular flange 44 on the ring 40 is provided with a plurality of equally circumferentially spaced distributing apertures 46, these apertures being coaxially arranged with respect to the mandrel 37.

Glass strand, indicated generally by the reference numeral 48 is payed off the several supply spools 20 and threaded through the respective apertures 18. These strands 48 are further passed beneath the first roller 12 which may be journaled in the sides of the tank 10 if desired, and from there are passed in straight lines through respective successive apertures 19a, 19b, 19c, then under the second roller 12 upwardly through the individual, respective apertures 24 over a second bar or roller 50 situated above the bar 22. One aperture 19a, 19b, 19c and 24 is provided for each strand 48, so that the latter follows a substantially straight line between the two rollers 12. From the bar 50, the strands are further passed beneath another guiding bar or roller 52 situated almost directly beneath the distributing ring 40. From here, the strands 48 are passed upwardly through the respective apertures 46, there being one aperture for each thread.

In a preferred embodiment of this invention, liquid, polyester resin is contained in the tank 10 to a level denoted by the numeral 14. As the threads 48 are drawn through the tank 10, they will be wetted by the resin therein.

The openings 19a, 19b and 19c may be regarded as collecting and sizing dies or bushings for the individual strands 48 passing therethrough. As each strand 48 initially enters the bath 14 and passes beneath the first roller 12, it flattens against the latter. The resin flows between and wets the individual filaments or fibers thereof. As the strand progresses to and through the opening 19a, it is grouped into a circular shape, thereby further subjecting it to impregnation by the resin. Further advancement through the remaining openings 19b and 19c compacts the strand into a still smaller size, squeezing and working the filaments such that entrapped or occluded air is eliminated. Levitating air bubbles in the resin adjacent to strip 17 evidences such elimination of air. It is important that no air be retained in the individual strands.

Strands 54 from the individual spools 28 are individually affixed to the mandrel 37 by some suitable means such as tying, thereby placing the apparatus in condition for operation.

An important feature resides in the tensioning of the strands 54 at the time the strands are applied to the mandrel 37. This is accomplished by means of the use of a thread guide 56 on each spool 28, the guide being formed of relatively stiff steel wire having two eyelets 58 and 60, respectively, on the upper end thereof. This guide is shown in enlarged detail in FIG. 4, and is secured to the support for each respective spool 28 to move therewith. The strand from each spool 28 is passed through the respective eyelets 58 and 60 which are spaced vertically and lie essentially in the same vertical plane. The eyelets are so arranged that as the strand 54 is pulled therethrough, it frictionally engages the eyelets and thereby tensions the strand as it is drawn upwardly to be applied to the mandrel 37.

For a given embodiment of this invention, the layers 48b and 68 each have twenty-four (24) strands or rovings 48, each strand being composed of fifty-nine (59) ends and each end being composed of two hundred four (204) basic fibers or filaments of glass. For the braided layers 62, 66, 70, twenty-four (24) strands or rovings 54 are used, each of these being composed of five (5) ends of two hundred four (204) glass fibers or filaments each. Each braided layer has twelve (12) strands encircling helically in one direction and a like number in the opposite direction.

In operation, a first layer of braid formed from the strands 54 is applied to the mandrel 37. This is accomplished by starting the braiding apparatus during which the spools 28 are moved at a uniform speed through the respective guiding grooves 34 and 36. Simultaneously, the mandrel 37 is slowly raised at a uniform speed at which the braid angle, or in other words the pitch angle of the helices of the braid, as it is applied to the mandrel, is maintained uniform. Considering for the moment the motion of the spools 28, it will be seen that they pass alternately inside and outside of each adjacent spool as they move in opposite directions in the respective guiding grooves. The braid is thus formed on the mandrel 37, the braiding operation being continued until the entire mandrel is covered with a braid layer from one end to the other. At this time, the strands 54 at the bottom of the mandrel 37 are cut and the free ends are tied securely to the mandrel so as to prevent the strands forming the braid from relaxing. These strands should be maintained in tension at all times.

Next, the mandrel 37 with the first braid layer 62 thereon is lowered in the distributing ring 48 to a position at which the upper end 64 of the mandrel is adjacent to the upper side of the ring 40. The free ends of the strands 48 which have been passed through the apertures 46 are now attached securely to the upper end 64 of the mandrel. The mandrel is axially raised slightly without rotation so as to apply tension to all of the strands 48 which now extend longitudinally of the mandrel 37, at which time the strands are equally spaced apart and lie in vertical planes. It should be remembered that these individual strands 48 are wet with resin from the tank 10. Also, the apertures 46 are close to the mandrel as will become apparent from the descriptions that follow.

The strands 54 from the spools 28 are once again tied to the top end 64 of the mandrel 37 over the strands 48. These longitudinally extending strands are denoted by the numeral 48a. At this point, the braider is operated as before so as to apply a second layer of braid over the longitudinally extending strands 48a while the mandrel 37 is raised at the same rate as previously during the application of the first layer 62. The second layer of braid is indicated by the numeral 66. The holes 46 are of larger size than the apertures 24 and made large enough to pass the individual threads 48 without wiping therefrom any more resin than is desired in the strands 48a. By reason of the attritional resistance between the apertures 46 and the strands 48, the strands 48a on the mandrel are further tensioned and maintained in substantially straight lines. Thus, the longitudinally extending strands 48a are always evenly distributed around the circumference of the mandrel, which provides a uniform radial thickness in the finished tube, as will become apparent from the description that follows. As previously stated, suitable resistance to drawing the strands provides a straightening tension as the strands 48a are applied to the mandrel 37.

Also, as previously explained, the strands forming the second layer 66 of braid over the strands 48a are tensioned, such that the strands 48a are frictionally and firmly clamped or gripped onto the first layer 62 of braid.

After the full length of the mandrel 37 has been moved upwardly through the distributing ring 40, for example, such mandrel may have a length of four or five feet, the braiding and pulling operations are stopped and the strands on the lower end of the mandrel are tied with a cord as before. All of the strands applied to the mandrel are tied at the ends of the latter so as to maintain the strands in tension. The strands are then cut off and the mandrel-layer assemblage is further processed as will be explained hereinafter.

As the outer layer 66 of braid is being applied, the liquid resin in the strands 48a is squeezed from the latter and exudes or flows into the strands of both braids 62 and 66. By this means, all of the strands of both braids 62 and 66 as well as the strands 48a become thoroughly impregnated. Inasmuch as the liquid resin in the strands 48a is forced both radially outwardly and inwardly, air which may be entrained in the strands forming the bairds 62 and 66 is driven out radially. This assures against the entrapment of air pockets within the finished assembly which could provide weak spots.

As will now be apparent, the number and sizes of the strands 48 and 54 and the amount of resin carried by the strands 48 will determine the thoroughness of the impregnation of the two braids 62 and 66. If too little resin is contained by the strands 48, not enough resin will be available to impregnate thoroughly the strands of the two braids 62 and 66. On the other hand, if the strands 48 carry too much resin, the ratio of resin to glass will be excessive and will provide a finished structure not having the characteristics desired in the finished shaft. Therefore, the apertures 24 in the stripping bar 22 are of critical size and serve in determining the quantity of resin retained in the strands 48a. For the specific examples given hereinbefore and hereafter, a glass-to-resin ratio of 75%–25%, as estimated from the strand 48 and aperture 24 sizes, for each strand emerging from an aperture 24 has been found to provide the advantages of this invention. In other words, the volume of each wetted strand 48 as it emerges from its aperture 24 is taken as 100% and of this 25% is resin and the balance is glass.

Figure 6:
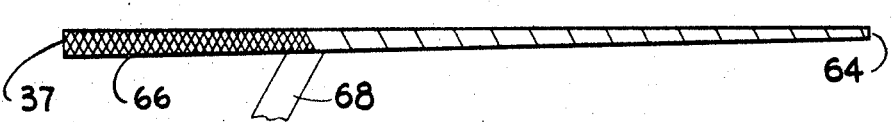
FIG. 6 illustrates a step in the method of fabricating this invention, this particular step involving the wrapping of a cellophane or Mylar material onto a resin wetted rod prior to the curing thereof.

Now referring to FIG. 6, the mandrel assemblage 37, 62, 48a, 66 is pressure-wrapped with a Mylar or cellophane tape 68 from one end to the other, the edges of this tape 68 being slightly overlapped to make certain that the entire outer surface of the braid 66 is covered. This wrapping operation may be performed by attaching the tape 68 to the end 64 and then spinning the mandrel 37 on its axis while guiding the tape 68 at an angle to the mandrel as shown in FIG. 6. The tape 68 is maintained in tension while this wrapping operation is performed so as to compress all of the fibers and strands together and to provide a smooth, glossy surface in the finished product following curing. When the wrapping operation is completed, the tape is tied securely to the butt end 65 of the mandrel 37.

The assemblage with the tape 68 thereon is next inserted into a curing oven, where it is heated until the resin has completely cured or hardened. Following this, the tape 68 is removed by unwrapping the same from the mandrel. Also, the mandrel 37 is removed, leaving the hollow structure shown in FIGS. 7 and 8.

If desired, prior to the application of the tape 68, the mandrel 37 with the layers of strand applied thereto may be inserted into a vacuum chamber for the purpose of withdrawing any air which may be entrapped between the layers or strands.

Torsional strength in the finished shaft is derived from the braid and in some measure by the "helix angle" thereof. "Helix angle" is defined as the constant angle between the tangent to a helix and a generator of the cylinder upon which the helix lies, or the complement thereof. In this explanation, only the complement is referred to as the "helix angle." The term is further defined as the angle between the tangent to one of the helics 54a and 54b of the braid and an intersecting plane at right angles to the axis of the mandrel 37. The "tangent" to a helix is that tangent which is parallel to the helix at the point of contact therewith. Thus, with the helix developed into a flat plane as shown in FIG. 5, the helix angle is measured between the individual strand 54 and the dashed line 21 which indicates the plane normal to the axis 23 of the mandrel 37. It has been found that the torsional strength of the shaft can be altered by altering the helix angle, a suitable angle lying in the range of from 40° to 50°.

Referring to FIG. 5, the braid is composed of two equal sets of strands, one set extending helically parallel in one circumferential direction and the other set extending helically parallel in the opposite direction, the strands of the two sets alternately passing under and over each other as shown. In one embodiment of this invention, each set has twelve (12) strands in side-by-side equally spaced relation. Therefore, the helical pitch of an individual strand is relatively large as compared to what it would be if one strand were close-wound in helical fashion.

Figure 7:
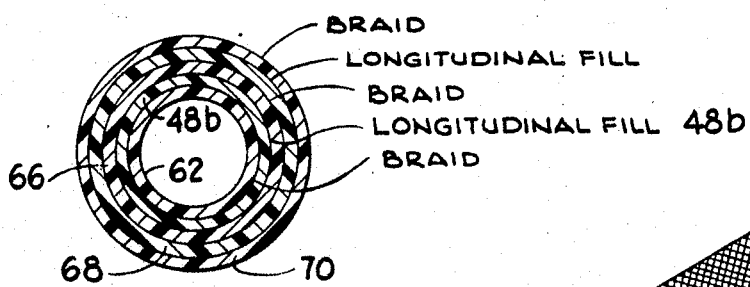
FIG. 7 is a cross-sectional illustration of a rod of this invention.
Figure 8:
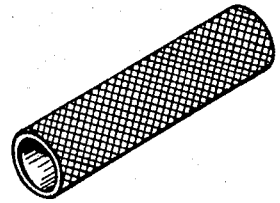
FIG. 8 is a perspective illustration thereof.

The shaft just described has three laminations or layers, these being the two braids 62 and 66 and the intermediate layer formed of the strands 48a. In FIG. 7, the two braided layers 62 and 66 are indicated by the same numerals and the intermediate layer composed of the strands 48a is indicated by the numeral 48b. For a given weight of glass, it has been found that greater strength, both torsional and longitudinal, can be achieved in a finished shaft by having a total of five (5) layers or laminations instead of three (3) as described. In FIG. 7, these additional two layers are indicated by the numerals 68 and 70, these being formed on the layer 66 identically as were the layers 48b and 66 on the braided layer 62. In other words, after the braided layer 66 has been applied to the layer 48b of longitudinal fill, another layer 68 of longitudinal fill (a layer of strands 48a) is laid against the layer 66 and securely clamped in tension thereto by another layer 70 of braid. The strands forming the two layers 48b and 68 being wet, resin will impregnate the strands of the braided layers. It should be noted that the number of glass fibers per unit of circumference in the layer 68 must be smaller than for layer 48b, because the two layers 68, 48b are identically formed.

Following the assembly and formation of these five layers, which in a given embodiment of this invention are substantially equal in thickness, on the mandrel 37, the wrapping 68 is applied as previously explained and the resin is cured. The wrapping 68 is then removed as is the mandrel 37 to provide the finished tubular shaft shown in FIGS. 7 and 8.

As is well known, glass fiber possesses substantial tensional strength. One of the problems involved in the fabrication of certain products such as golf shafts is the utilization of the tensional strength which the glass fibers afford. It has been discovered that in the fabrication of fishing rods and other products that greater strength in the finished product can be achieved if the glass fibers and threads or strands formed therefrom are maintained in tension while the resin cures.

In the formation of extruded glass products, fishing poles, supporting rods and the like, longitudinally extending strands of glass have heretofore been used; however, it has been determined that while certain of the glass fibers forming these strands have been tensioned, a certain number have not and have been permitted to relax. These relaxed fibers in the finished product are usually curved or wrinkled. It is therefore desirable to maintain as many as possible of the glass fibers straight and tensioned so as to derive from the glass strands the maximum degree of strength the thread provides.

The present invention is unique for the reason that it provides a unique improvement in maintaining the fibers straight and tensioned. The longitudinally extending threads 48a forming the layer 48b (FIG. 7) are effectively tightly clamped between the two layers 62 and 66 of braid, as are the strands which form the layer 68 between the layers 66 and 70 of braid. The initial tension applied to the strands 48a during fabrication is, of course, essential and apparent in the final product. Secondly, as the layer 66 of braid is applied over the strands 48a, the braid application results in the frictional gripping or clamping of the strands 48a thereby exerting a further holding force on the fibers composing the strands 48a. The strands 48a are thereby frictionally engaged on the radially inner and outer portions thereof, as viewed in FIG. 7, by the two layers 62 and 66 of braid. Thus, the fibers of the strands 48a and the layer 48b (FIG. 7) are frictionally resisted from relaxing. Therefore, by not making the layer 48b too thick, or in other words making this layer of about the same thickness as the layers 62 and 66, a substantial portion of the glass fiber forming the layer 48b is frictionally gripped and maintained in straightened and tensioned condition.

It has been found that the use of only a single layer of longitudinal fill covered by only a single layer of braid will not have the same torsional and flexural strength characteristics as does a shaft or rod using the same amount of resin and glass and formed of a plurality of alternated laminations as just described.

Figure 9:
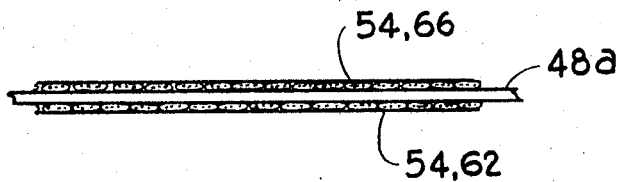
FIG. 9 is an enlarged, fragmentary illustration in longitudinal section and in diagrammatic form of a portion of the rod of FIG. 8.

Another contributing factor to the strength afforded by this new shaft is believed to reside in the fact that the longitudinal fill constituting the layers 48b and 68 is maintained relatively straight, flat and otherwise wrinkle-free, as represented by the showing in FIG. 9. In FIG. 9 are shown the strands 54 as they constitute the two braids 62 and 66. Clamped therebetween is a strand 48a. As is shown, the individual strands 54 are somewhat flattened and more elliptical in shape than round. Also, the strands 54 are contiguous and in the individual braids 62 and 66 form a substantially even and flat surface for the strand 48a to lie against. This results in the strand 48a being substaintially straight and wrinkle-free, and in this condition the strand 48a imparts maximum tensional strength to the finished product. The fewer wrinkles and curves in the glass fiber or strand results in greater strength. Thus, the sratnds 54 interlocked in the braids 62 and 66 provide more uniform, even surfaces for engagement with the longitudinal fill 48a for maintaining the latter as straight as possible. This contrasts distinctly with the more uneven glass surfaces provided by the method known as "filament winding" wherein a mandrel is spun about its axis and a glass thread is continuously wound thereon.

The following specifications are given for the shaft of a typical golf club, and are given by way of example only and not as limitations; other specifications may be used without departing from the spirit and scope of this invention:

Resin—Polyester, heat curable, 500 centipoise or less
Length of mandrel 37—42 inches
Diameter of mandrel 37 at the smaller end—⅛ inch
Diameter of mandrel 37 at the larger end—½ inch
Inner diameter of distributing ring 40—1½ inches
Number of apertures 46—24
Diameter of apertures 46—⅛ inch (used only as guides)
Diameter of apertures 24—.055 inch diameter
Number of apertures 24—24
Specifications of each strand 48, 48a—59 ends of glass, 204 filaments per end
Number of strands 48a—24
Specifications for each strand 54—5 ends of glass, 204 filaments per end
Number of spools 28 (strands 54)—24
Outside diameter of shaft at head end—.400 inch (adjacent to club head)
Outside diameter of shaft at handle end—⅝ inch.

While there have been described above the principles of this invention in connection with specific apparatus, it is to be clearly understood that this description is made only by way of example and not as a limitation to the scope of the invention.

What is claimed is:

1. A hollow reinforced plastic rod comprising a plurality of contiguous layers of glass-fiber reinforcement which surround a given imaginary axis, said layers being embedded within and bonded to each other by a cured resinous material; two of said layers each comprising strands of glass fibers in the form of a first helix and a second helix, the glass fibers of said first helix extending in one circumferential direction, the glass fibers of said second helix extending in the opposite circumferential direction, a third of said layers being clamped between said two layers and comprising a plurality of longitudinally extending substantially straight circumferentially adjacent strands of glass fibers, said two layers holding the strands of said third layer in position.

2. The rod of claim 1 wherein the strands of the first and second helices are braided together and circumferentially engaged with said third layer of strands to grip frictionally the latter strands in place.

3. The rod of claim 1 wherein the strands of the first and second helices are braided together and circumferentially engaged with said third layer of strands to grip frictionally the latter strands in place, there being only one of each first and second helix for each of said first and second layers, the strands of each helix being substantially equally spaced apart and held in place by the braided relationship of the strands, the facing surfaces of said two layers in a longitudinal direction being substantially uniformly straight whereby the longitudinally extending strands will be of corresponding straightness with minimum wrinkling, said longitudinally extending strands thereby imparting with maximum effectiveness longitudinal stiffness and strength to the finished rod.

4. The rod of claim 1 wherein the strands of the first and second helices are braided together and circumferentially engaged with said third layer of strands to grip fractionally the latter strands in place, the facing surfaces of the braids of said two layers, respectively, being substantially smooth longitudinally of the rod, the longitudinally extending strands thereby being of a straightness and wrinkle-free condition as corresponds to the smoothness of said surfaces, the longitudinally extending strands thereby imparting with maximum effectiveness longitudinal stiffness and strength to the finished rod.

5. The rod of claim 1 wherein the strands of the first and second helices are braided together and circumferentially engaged with said third layer strands to grip frictionally the latter strands in place, said braided layers exerting radially clamping and longitudinally extending forces on the strands of said third layer.

6. The rod of claim 1 in which there are at least five of said layers, three of said layers having the helical structure of said two layers, the remaining two of said layers having the strand structure of said third layer, said remaining two layers being clamped between the strands of said helical layers, respectively, such that there is one of said remaining two layers separating two adjacent helical layers.

7. The rod of claim 1 in which there are at least four of said layers, the first two of said layers having the helical structure of said two layers, the second two of said layers having the strand structure of said third layer, said first and second layers being alternated such that one of the second layers is clamped between said first two layers, the strands of said layers being contiguous.

8. The rod of claim 7 in which the number of fibers per unit of circumference for the radially innermost of said second two layers is greater than the number for the radially outermost ones thereof.

9. The steps in the method of fabricating a hollow laminated reinforced plastic rod comprising braiding glass strands onto an elongated body for forming a first braided layer, tensioning said strands during braiding, drawing a plurality of glass strands through a bath of liquid heat-hardenable resin, gathering the resin wetted strands in a second layer about the peripheral surface of said braided layer, said wetted strands being tensioned and arranged substantially parallel to the axis of said body, braiding a third layer of tensioned glass strands onto said second layer, frictionally exerting a tension force on the strands of said second layer during the last-mentioned braiding step thereby clamping said second layer strands in straightened condition between said braided layers, the resin in said second layer thereby being exuded into and impregnating the braided layers, controlling the quantity of resin applied to said second layer strands so as to provide sufficient resin for impregnating and embedding the strands of all layers into a unified mass of resin, and curing said resin to bond all of said strands and layers together.

10. The method of claim 9 wherein the resin is polyester and the ratio of glass to resin for the resin wetted strands by volume being about three to one.

11. The method of claim 9 wherein the strands of said second layer are drawn through orifices of predetermined size to determine the quantity of resin retained by these second layer strands.

12. The method of claim 9 wherein the strands of said second layer are drawn through orifices of predetermined size to determine the quantity of resin retained by these second layer strands, and applying a pressure wrapping of molding tape material to the outermost layer prior to the final curing step thereby further securing and compressing said layers together.

13. The method of claim 9 including the steps of applying a fourth layer like the second layer onto said third layer prior to curing, said fourth layer strands being wetted with resin the same as said second layer strands, braiding a fifth layer like said third layer onto said fourth layer prior to said curing step, the strands of said first, third and fifth layers being dry when braided, the resin in said second and fourth layers impregnating said braided layers, the strands of said second and fourth layers being drawn through orifices of predetermined size to determine the quantity of resin retained thereby.

14. The steps in the method of fabricating a hollow laminated reinforced plastic rod comprising braiding strands of glass fiber roving onto an elongated body forming a first braided layer, tensioning said strands during braiding, arranging a plurality of strands of glass fiber roving about the peripheral surface of said braided layer in substantial parallelism with the axis of said body to form a second layer, tensioning the last-mentioned strands to maintain the fibers thereof straight, braiding a third layer of tensioned strands of glass fiber roving onto said second layer, frictionally clamping the strands of said second layer during the last-mentioned braiding step between said braided layers, impregnating all of said layers with liquid hardenable resin so as to embed said strands therein, and hardening said resin to bond all of said strands and layers together, the fibers of said second layer strands being maintained straight by the hardened resin and the mechanical clamping force of said braided layers.

15. The method of claim 14 including the steps of applying a fourth layer like the second layer onto said third layer, braiding a fifth layer like said third layer onto said fourth layer, frictionally clamping the strands of said fourth layer during the last-mentioned braiding step between the third and fifth braided layers, impregnating all of said layers and embedding all of said strands in said liquid resin, and hardening said resin to bond all of said strands and layers together.

16. The method of claim 14 in which the strands of said braided layers are braided with no resin thereon, said strands of said second layer being wetted with predetermined amounts of liquid hardenable resin prior to formation into said second layer, applying said third layer onto said second layer with sufficient force that cause liquid resin in said second layer to exude into and to impregnate the strands of said braided layers.

References Cited

UNITED STATES PATENTS

| | | | |
|---|---|---|---|
| 937,021 | 10/1909 | Cobb | 156—148 XR |
| 2,602,766 | 7/1952 | Francis | 161—175 XR |
| 3,007,497 | 11/1961 | Shobert | 138—125 |
| 3,033,729 | 5/1962 | Shobert | 156—161 XR |

EARL M. BERGERT, Primary Examiner

M. E. McCAMISH, Assistant Examiner

U.S. Cl. X.R.

138—125; 156—148, 173; 161—176; 273—80